United States Patent [19]
Trumbower

[11] Patent Number: 6,055,812
[45] Date of Patent: May 2, 2000

[54] SYSTEM AND METHOD FOR CONTROLLING A SEQUENTIAL TURBOCHARGING SYSTEM

[75] Inventor: Michael W. Trumbower, Wawaka, Ind.

[73] Assignee: Detroit Diesel Corporation, Detroit, Mich.

[21] Appl. No.: 09/207,179

[22] Filed: Dec. 8, 1998

[51] Int. Cl.⁷ .................................................. F02B 33/44
[52] U.S. Cl. ................................................................ 60/612
[58] Field of Search ................................................ 60/612

[56] References Cited

U.S. PATENT DOCUMENTS

| | | |
|---|---|---|
| 4,075,849 | 2/1978 | Richardson . |
| 4,203,296 | 5/1980 | Tanaka et al. . |
| 4,292,806 | 10/1981 | Moore et al. . |
| 4,397,285 | 8/1983 | O'Neill . |
| 4,428,199 | 1/1984 | Moore et al. . |
| 4,442,672 | 4/1984 | Fischer . |
| 4,467,607 | 8/1984 | Rydquist et al. . |
| 4,489,557 | 12/1984 | Fawcett et al. . |
| 4,671,068 | 6/1987 | Moody et al. . |
| 4,679,398 | 7/1987 | Noguchi et al. . |
| 4,680,933 | 7/1987 | Bozung et al. . |
| 4,697,421 | 10/1987 | Otobe et al. . |
| 4,741,163 | 5/1988 | Hidaka et al. . |
| 4,745,755 | 5/1988 | Kawamura . |
| 4,779,423 | 10/1988 | Szczupak . |
| 4,848,086 | 7/1989 | Inoue . |
| 4,953,110 | 8/1990 | Chartrand . |
| 5,069,194 | 12/1991 | Deutschmann et al. . |
| 5,123,246 | 6/1992 | Younessi et al. . |
| 5,148,364 | 9/1992 | Scherer . |
| 5,186,081 | 2/1993 | Richardson . |
| 5,231,830 | 8/1993 | Entenmann et al. . |
| 5,261,236 | 11/1993 | Ironside et al. . |
| 5,445,128 | 8/1995 | Letang et al. . |
| 5,477,827 | 12/1995 | Weisman et al. . |
| 5,622,053 | 4/1997 | Freen . |
| 5,709,192 | 1/1998 | Zimmermann . |
| 5,769,052 | 6/1998 | Oestreicher et al. . |
| 5,771,867 | 6/1998 | Amstutz et al. . |
| 5,791,145 | 8/1998 | Freen . |

FOREIGN PATENT DOCUMENTS

| | | |
|---|---|---|
| 30 05 108 | 8/1981 | Germany . |
| WO/97/45633 | 12/1997 | WIPO . |

OTHER PUBLICATIONS

R. Schulmeister Et Al., Advanced Diesel Engines With Integrated Electronics Systems, ImechE, 1991, C430/012, Germany.

SAE Technical Paper Series, 951201, "Electronic Engine Management on an MTU 396 Heavy Duty Truck Engine", Steffan Spindler, SAE Library, 1995.

SAE Technical Paper Series, "Electronic Control of A Variable Geometry Turbocharger", Dilip Jain, May 3, 1990, SAE Library.

*Primary Examiner*—Noah P. Kamen
*Attorney, Agent, or Firm*—Brooks & Kushman P.C.

[57] ABSTRACT

A method for controlling an internal combustion engine with a sequential turbocharging system limits an applied engine torque to a dynamic engine torque limit value to achieve increased turbocharger shaft acceleration during the presence of a mode switch pending condition. The presence of the mode switch pending condition indicates that the sequential turbocharging system is operating in the first mode, in which the primary turbocharger is active, and it is desired to operate the system in the second mode, in which both the primary and secondary turbochargers are active.

9 Claims, 2 Drawing Sheets

SYSTEM AND METHOD FOR CONTROLLING A SEQUENTIAL TURBOCHARGING SYSTEM

TECHNICAL FIELD

The present invention relates to systems and methods for controlling an internal combustion engine with a sequential turbocharging system.

BACKGROUND ART

In the control of internal combustion engines, the conventional practice utilizes electronic control units having volatile and non-volatile memory, input and output driver circuitry, and a processor capable of executing a stored instruction set, to control the various functions of the engine and its associated systems. A particular electronic control unit communicates with numerous sensors, actuators, and other electronic control units to control various functions, which may include various aspects of fuel delivery, transmission control, sequential turbocharging system control, or many others.

A turbocharger consists of a turbine and a compressor. The pressure of the engine exhaust gases causes the turbine to spin. The turbine drives the compressor, which is typically mounted on the same shaft. The spinning compressor creates turbo boost pressure which develops increased power during combustion. A wastegate at the turbine intake limits the amount of boost pressure to protect the turbocharger and engine components. When boost pressure reaches a predetermined value, the wastegate opens to provide a bypass for a portion of the exhaust gases which pass directly into the exhaust manifold.

In a sequential turbocharging system, a plurality of turbochargers are provided. The engine controller activates the turbochargers as needed based on engine operating conditions. One form of a sequential turbocharging system is the dual turbocharging system in which a primary turbocharger is always active, and in which a secondary turbocharger is selectively activated by the engine controller, as needed.

One use for dual sequential turbocharging systems is on marine engines. Although existing sequential turbocharging systems, including dual type sequential turbocharging systems have been used in many applications that have been commercially successful, the existing systems do have some disadvantages. On very heavy boats, such as sport-fishing, where there is a significant amount of load on engines during acceleration, switching from single turbo mode to dual turbo mode may sometimes overload the engine from which it cannot recover. The engine must then switch back into single turbo mode to rebuild its boost pressure and accelerate. This overloading upon switching to dual turbo mode from single turbo mode may happen several times before the system finally may remain in dual turbo mode.

SUMMARY OF THE INVENTION

It is therefore an object of the present invention to provide an improved system and method for controlling a sequential turbocharging system that limits applied engine torque to control turbocharger shaft speed, while controlling shaft speed so as to achieve significantly higher shaft acceleration during a turbocharger mode switch pending condition.

In carrying out the above object and other objects and features of the present invention, a method for controlling an internal combustion engine with a sequential turbocharging system is provided. The sequential turbocharging system includes a primary turbocharger and a secondary turbocharger. The sequential turbocharging system is capable of operating in a first mode wherein the primary turbocharger is active while the secondary turbocharger is inactive. The sequential turbocharging system is further capable of operating in a second mode wherein both the primary turbocharger and the secondary turbocharger are active. The method comprises determining the presence or absence of a mode switching pending condition in which the sequential turbocharging system is operating in the first mode and it is desired to operate the sequential turbocharging system in the second mode. A turbocharger shaft speed limit value based on the presence or absence of the mode switch pending condition is determined. The primary turbocharger is monitored to determine a current value for a primary turbocharger shaft speed. An error signal based on the current value for the primary turbocharger shaft speed and the turbocharger shaft speed limit value is determined. A dynamic engine torque limit value based on the error signal is determined. The dynamic engine torque limit value is determined so as to track the current value for the primary turbocharger shaft speed to the turbocharger shaft speed limit value, when an applied engine torque is the dynamic engine torque limit value.

The method further comprises limiting the applied engine torque to the dynamic engine torque limit value. The turbocharger shaft speed limit value during the presence of a mode switch pending condition significantly exceeds the turbocharger shaft speed limit during the absence of the mode switch pending condition such that the presence of the mode switch pending condition results in a significantly increased error signal. The increased error signal results in a significantly increased dynamic engine torque limit value. Advantageously, increased turbocharger shaft acceleration is achieved when a turbocharger mode switch is pending which reduces the likelihood of overloading the engine upon activation of the secondary turbocharger.

Preferably, the turbocharger shaft speed limit value is based on engine speed.

Further, in carrying out the present invention, a control system for controlling an internal combustion engine with a sequential turbocharging system is provided. The control system comprises a sensing device for monitoring the primary turbocharger to determine a current value for a primary turbocharger shaft speed. The control system further comprises control logic for determining the presence or absence of a mode switch pending condition, for determining a turbocharger shaft speed limit value, for determining an error signal, for determining a dynamic engine torque limit value, and for limiting an applied engine torque to the dynamic engine torque limit value. The turbocharger shaft speed limit value during the presence of the mode switch pending condition significantly exceeds the turbocharger shaft speed limit value during the absence of the mode switch pending condition. As such, a mode switch pending condition results in a significantly increased error signal, resulting in a significantly increased dynamic engine torque limit value.

Still further, in carrying out the present invention, a computer readable storage medium is provided. The computer readable storage medium has information stored thereon representing instructions executable by an engine controller to control a vehicle having an internal combustion engine with a sequential turbocharging system. The computer readable storage medium further comprises instructions for determining the presence or absence of a mode switch pending condition, instructions for determining a turbocharger shaft speed limit value, instructions for monitoring the primary turbocharger, and instructions for determining an error signal. The computer readable storage medium still further comprises instructions for determining a dynamic engine torque limit value, and instructions for limiting an applied engine torque to the dynamic engine torque limit value. The turbocharger shaft speed limit value during the presence of the mode switch pending condition significantly exceeds the turbocharger shaft speed limit value during the absence of the mode switch pending condition. As such, a mode switch pending condition results in a significantly increased error signal, resulting in a significantly increased dynamic engine torque limit value.

The advantages associated with embodiments of the present invention are numerous. For example, systems and methods of the present invention are capable of effectively limiting final torque to maintain turbocharger shaft speed, while achieving significantly increased turbocharger shaft acceleration when a mode switch pending condition is present. The increased shaft acceleration reduces the likelihood of overloading the engine and significantly losing boost pressure upon activating the secondary turbocharger.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
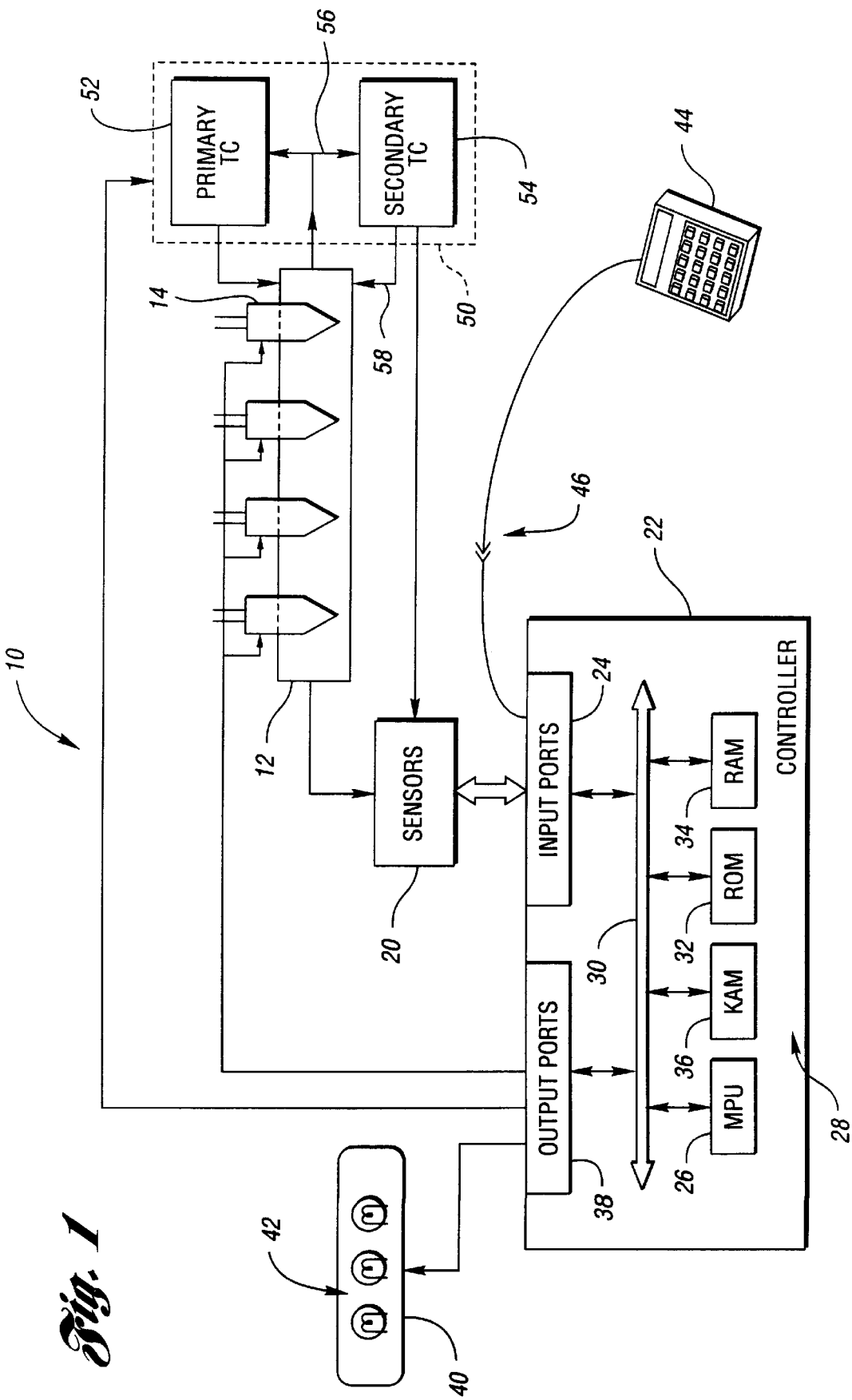
FIG. 1 is a schematic diagram of a control system for controlling an internal combustion engine with a sequential turbocharging system.

Referring now to FIG. 1, a system for controlling a sequential turbocharging system is shown. The system, generally indicated by reference numeral 10, includes an engine 12 having a plurality of cylinders, each fed by fuel injectors 14. In a preferred embodiment, engine 12 is a compression-ignition internal combustion engine, such as a four, six, eight, twelve, sixteen or twenty-four-cylinder diesel engine, or a diesel engine having any other desired number of cylinders. Fuel injectors 14 receive pressurized fuel from a supply connected to one or more high or low pressure pumps (not shown) as is well known in the art. Alternatively, embodiments of the present invention may employ a plurality of unit pumps (not shown), each pump supplying fuel to one of the injectors 14.

The system 10 includes a sequential turbocharging system 50 for drawing air into the cylinders to create increased power during combustion. Sequential turbocharging system 50 is a dual sequential turbocharging system which includes a primary turbocharger 52 and a secondary turbocharger 54. Engine exhaust is routed to the turbocharger turbine inlets along lines 56. Air drawn into the engine air intake is routed through the compressors and to the engine through air inlet lines 58. It is to be understood that the dual sequential turbocharging system is shown for purposes of illustration, and that systems and methods of the present invention may be employed in any multi-turbo sequential turbocharging system to assist any mode switch wherein an additional turbocharger is activated. That is, the term "first mode" as used herein means any operating mode having less active turbochargers than meant by the "second mode" as used herein.

Further, the term "primary turbocharger" as used herein means a single or set of turbochargers that are active when operating in the "first mode"; and, the term "secondary turbocharger" as used herein means a single or set of turbochargers that are inactive in the "first mode" and are activated upon transition to the "second mode". As such, one of ordinary skill in the art appreciates the broad applicability of the teachings of the present invention in the art of sequential turbocharging systems of which a dual type system is merely exemplary, and is described herein to facilitate an understanding of the present invention.

The system 10 may also include various sensors 20 for generating signals indicative of corresponding operational conditions or parameters of engine 12, the vehicle transmission (not shown), turbocharging system 50, and other vehicular components. Sensors 20 are in electrical communication with a controller 22 via input ports 24. Controller 22 preferably includes a microprocessor 26 in communication with various computer readable storage media 28 via data and control bus 30. Computer readable storage media 28 may include any of a number of known devices which function as a read-only memory (ROM) 32, random access memory (RAM) 34, keep-alive memory (KAM) 36, and the like. The computer readable storage media may be implemented by any of a number of known physical devices capable of storing data representing instructions executable via a computer such as controller 22. Known devices may include, but are not limited to, PROM, EPROM, EEPROM, flash memory, and the like in addition to magnetic, optical, and combination media capable of temporary or permanent data storage.

Computer readable storage media 28 implement control logic via software, firmware, microcode, and/or circuitry to effect control of various systems and subsystems of the vehicle, such as engine 12, a vehicle transmission (not shown), turbocharging system 50, and the like. Controller 22 receives signals from sensors 20 via input ports 24 and generates output signals which may be provided to various actuators and/or components via output ports 38. Signals may also be provided to a display device 40 which includes various indicators such as lights 42 to communicate information relative to system operation to the operator of the vehicle.

A data, diagnostics, and programming interface 44 may also be selectively connected to controller 22 via a plug 46 to exchange various information therebetween. Interface 44 may be used to change values within the computer readable storage media 28, such as configuration settings, calibration variables, fault threshold values, control logic, and the like, including turbocharger shaft speed limit value maps which are preferably implemented as look-up tables.

In operation, controller 22 receives signals from sensors 20 and executes control logic to control the primary turbocharger shaft speed by limiting final or applied torque. Further, controller 22 executes control logic to achieve significantly increased primary turbocharger shaft acceleration when a turbocharger mode switch pending condition is present, by increasing the turbocharger shaft speed limit value. The increased turbocharger shaft acceleration decreases the likelihood of overloading the engine and losing boost pressure to a point that it cannot recover when the system activates the secondary turbocharger by opening additional exhaust passageways that were previously closed.

In a preferred embodiment, controller 22 is the DDEC controller available from Detroit Diesel Corporation, Detroit, Mich. Various other features of this controller are described in detail in U.S. Pat. Nos. 5,477,827 and 5,445,128, the disclosures of which are hereby incorporated by reference in their entirety.

With continuing reference to FIG. 1, a logic controller, such as microprocessor 26, controls the signals sent to the fuel injectors 14. Microprocessor 26 computes a provisional or desired engine torque based on operator demand and current operating conditions. The provisional engine torque may be limited by a dynamic engine torque limit value according to the present invention. The signals sent to fuel injectors 14 are then based on the applied engine torque (after torque limiting, when appropriate). In sequential turbocharger system 50, microprocessor 26 determines the turbocharger system mode of operation, such as, for example, single turbo or multiple-turbo mode. The dynamic torque limiting and turbo mode selection may be included in the functions of microprocessor 26, or may be implemented in any other manner known in the art of hardware and software control systems including an independent control unit which is in communication with controller 22 for turbocharger control.

As will be appreciated by one of ordinary skill in the art, the control logic may be implemented or effected in hardware, software, or a combination of hardware and software. The various functions are preferably effected by a programmed microprocessor, such as the DDEC controller, but may include one or more functions implemented by dedicated electric, electronic, or integrated circuits. As will also be appreciated, the control logic may be implemented using any one of a number of known programming and processing techniques or strategies and is not limited to the order or sequence illustrated here for convenience. For example, interrupt or event driven processing is typically employed in real-time control applications, such as control of a vehicle engine or transmission. Likewise, parallel processing or multi-tasking systems and methods may be used to accomplish the objects, features, and advantages of the present invention. The present invention is independent of the particular programming language, operating system, or processor used to implement the control logic illustrated.

Figure 2:
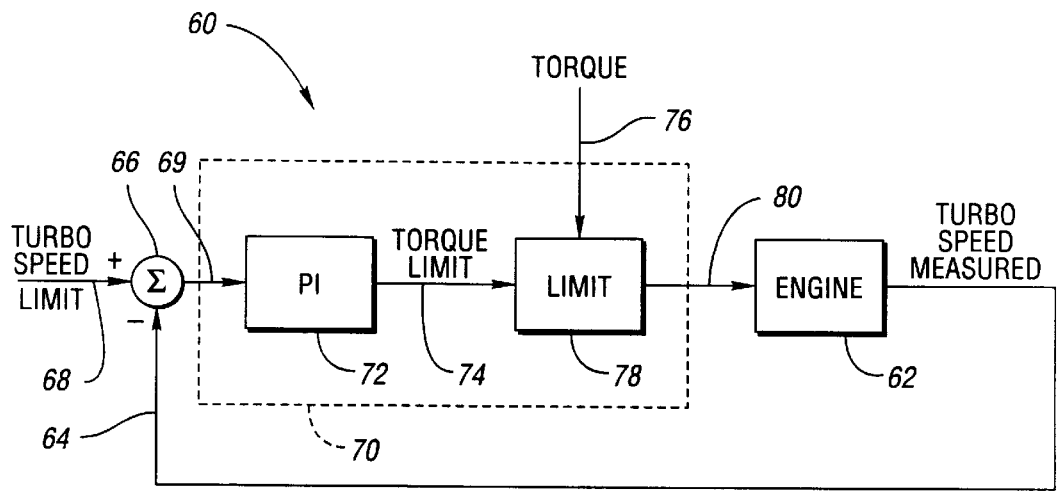
FIG. 2 is a block diagram of a closed loop control system of the present invention which determines the dynamic engine torque limit value based on a turbine speed error signal.

With reference to FIG. 2, a dynamic engine torque limit value is used to control the final or applied torque to maintain turbocharger shaft speed; and, as desired, the dynamic engine torque limit value is controlled to achieve rapid acceleration of the turbocharger shaft when a mode switch pending condition is present. The torque limit is determined, preferably, based on a closed loop control system, generally indicated at 60. In closed loop control system 60, engine 62 is the plant, at which a current value for the primary turbocharger shaft speed is measured. Measured primary turbocharger shaft speed 64 is an input to a summer 66 at the negative terminal. A turbocharger shaft speed limit value 68 is input to the positive terminal of summer 66. The turbocharger shaft speed limit value is determined based on the presence or absence of a mode switch pending condition.

More particularly, during the absence of the mode switch pending condition, the turbocharger shaft speed limit value is set at a value sufficient for normal engine operation. During the presence of a mode switch pending condition, the turbocharger shaft speed limit value is set to a value that exceeds the turbocharger shaft speed limit values during normal operation. The limit value in the presence of a mode switch pending condition exceeds the limit value during the absence of the mode switch pending condition by an amount sufficient to achieve the desired increased acceleration of the turbocharger shaft. That is, the turbocharger shaft speed limit value is based on engine conditions, including the presence or absence of the mode switch pending condition. During development, the inventor has found that for any particular internal combustion engine with a sequential turbocharging system, the values for the turbocharger shaft speed limit value at different engine conditions are best found by either empirical or actual testing. A suitable way to implement the turbocharger shaft speed limit values into the control system is with a look-up table that is accessible by the engine controller.

An error signal 69 at the output of summer 66 is based on the current value 64 for the primary turbocharger shaft speed and the turbocharger shaft speed limit value 68. Although error signal 69 is shown as a direct summation of reference and actual values for turbo speed, other methods of generating an error signal may be suitable as would be appreciated by one of ordinary skill in the art of tracking control systems such as closed loop systems. A controller 70 is one suitable way for processing error signal 69 to obtain a signal useful to engine 62. Controller 70 preferably includes a proportional component and an integral component indicated together at block 72. Error signal 69 feeds through proportional and integral term 72 to produce the dynamic engine torque limit 74. Of course, it is to be appreciated that the use of proportional and integral terms is one suitable technique for determining dynamic engine torque limit 74, and other techniques may be employed for determining the dynamic engine torque limit such that measured turbo speed 64 may track to turbo speed 68.

A provisional torque 76 is supplied by the engine controller (22, FIG. 1). A limiter 78 limits an applied engine torque 80 to dynamic engine torque limit value 74. As such, closed loop control system 60 effectively tracks measured turbo speed 64 to turbo speed limit 68 when torque limiter 78 is active.

It is preferred that limiter 78 is always active during engine accelerations so that applied torque 80 is always limited to the dynamic engine torque limit 74 (during engine accelerations). As such, increased turbocharger shaft acceleration is achieved by increasing the value of turbo speed limit 68 in accordance with the present invention when a mode switch pending condition is present. That is, in operation, measured turbo speed 64 approaches turbo speed limit 68 in a controlled manner due to controller 70. When a rapid increase in turbo charger shaft speed acceleration is desired, turbocharger shaft speed limit value 68 is increased, in accordance with the present invention, allowing controller 70 to quickly respond by increasing torque limit 74, resulting in a significantly increased applied torque 80.

It is to be appreciated that closed loop control system 60 may also be used, as desired, to prevent turbocharger shaft overspeeding. But, it is to be appreciated that an object of the present invention is to control a turbocharger so as to achieve rapid shaft acceleration prior to a mode switch without necessarily being concerned as to the turbocharger shaft speed.

Figure 3:
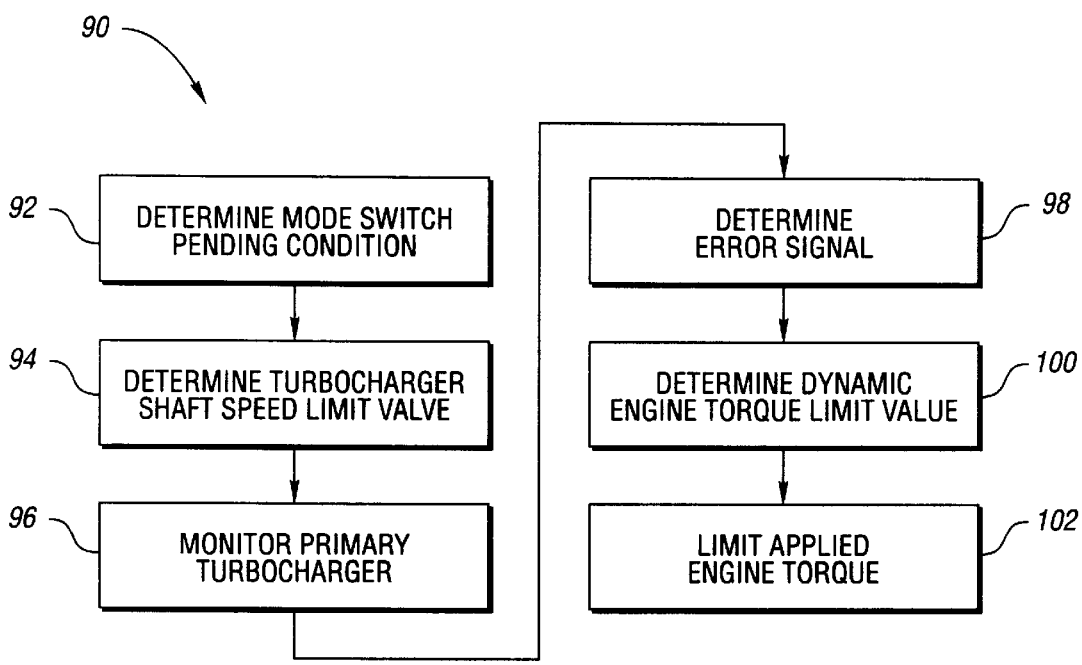
FIG. 3 is a block diagram illustrating a method of the present invention for controlling an internal combustion engine with a sequential turbocharging system.

With reference to FIG. 3, a method of the present invention for controlling an internal combustion engine with a sequential turbocharging system is generally indicated at 90. At block 92, the presence or absence of a mode switch pending condition is determined. At block 94, a turbocharger shaft speed limit value is determined based on the presence or absence of the mode switch pending condition. Preferably, the turbocharger shaft speed limit value is further based on engine conditions including engine rpm. At block 96, the primary turbocharger is monitored to determine a current value for the primary turbocharger shaft speed. Of course, as mentioned previously, the term "primary turbocharger" may mean a group of turbochargers that are active in the "first mode" of system operation. In such an embodiment, monitoring the "primary turbocharger" shaft speed may be performed by monitoring the shaft speed of any one of the turbochargers active in the first mode, or by determining an average shaft speed, or any other technique as would appreciated by one of ordinary skill in the art.

At block 98, an error signal is determined. The error signal is based on the current value for the primary turbocharger shaft speed and the turbo charger shaft speed limit value. At block 100, the dynamic engine torque limit value is determined. The limit value is based on the error signal so as to track the current value for the primary turbocharger shaft speed to the turbocharger shaft speed limit value. At block 102, applied engine torque is limited to the dynamic engine torque limit value. It is to be appreciated that the dynamic engine torque limit value varies based on the turbocharger shaft speed limit value. Accordingly, the dynamic engine torque limit is greater during the presence of a mode switch pending condition than during the absence of a mode switch pending condition. As such, the presence of a mode switch pending condition results in a significantly increased error signal, resulting in a significantly increased dynamic engine torque limit value. Of course, it is to be appreciated that the relative values of the torque limit during the presence or absence of a mode switch pending condition need only differ by an amount sufficient to cause the desired increase in turbo charger shaft acceleration. As such, the amount of shaft acceleration desired prior to a mode switch may vary from engine to engine, and an appropriate shaft acceleration for a particular engine may be formed by engine testing, as appreciated by one of ordinary skill in the art.

While the best mode contemplated for carrying out the invention has been described in detail, those familiar with the art to which this invention relates will recognize various alternative designs and embodiments for practicing the invention as defined by the following claims.

What is claimed is:

1. A method for controlling an internal combustion engine with a sequential turbocharging system, the sequential turbocharging system including a primary turbocharger and a secondary turbocharger, and being capable of operating in a first mode wherein the primary turbocharger is active while the secondary turbocharger is inactive, and further being capable of operating in a second mode wherein both the primary turbocharger and the secondary turbocharger are active, the method comprising:

determining the presence or absence of a mode switch pending condition in which the sequential turbocharging system is operating in the first mode and it is desired to operate the sequential turbocharging system in the second mode;

determining a turbocharger shaft speed limit value based on the presence or absence of the mode switch pending condition;

monitoring the primary turbocharger to determine a current value for a primary turbocharger shaft speed;

determining an error signal based on the current value for the primary turbocharger shaft speed and the turbocharger shaft speed limit value;

determining a dynamic engine torque limit value based on the error signal so as to track the current value for the primary turbocharger shaft speed to the turbocharger shaft speed limit value; and limiting an applied engine torque to the dynamic engine torque limit value, wherein the turbocharger shaft speed limit value during the presence of the mode switch pending condition significantly exceeds the turbocharger shaft speed limit during the absence of the mode switch pending condition such that the presence of the mode switch pending condition results in a significantly increased error signal, resulting in a significantly increased dynamic engine torque limit value.

2. The method of claim 1 wherein determining the turbocharger shaft speed limit value further comprises:

determining the turbocharger shaft speed limit value based on engine speed.

3. The method of claim 1 further comprising:

switching the mode of the sequential turbocharging system from the first mode to the second mode such that both the primary turbocharger and the secondary turbocharger are active.

4. A control system for controlling an internal combustion engine with a sequential turbocharging system, the sequential turbocharging system including a primary turbocharger and a secondary turbocharger, and being capable of operating in a first mode wherein the primary turbocharger is active while the secondary turbocharger is inactive, and further being capable of operating in a second mode wherein both the primary turbocharger and the secondary turbocharger are active, the control system comprising:

a sensing device for monitoring the primary turbocharger to determine a current value for a primary turbocharger shaft speed;

control logic for determining the presence or absence of a mode switch pending condition in which the sequential turbocharging system is operating in the first mode and it is desired to operate the sequential turbocharging system in the second mode;

control logic for determining a turbocharger shaft speed limit value based on the presence or absence of the mode switch pending condition;

control logic for determining an error signal based on the current value for the primary turbocharger shaft speed and the turbocharger shaft speed limit value;

control logic for determining a dynamic engine torque limit value based on the error signal so as to track the current value for the primary turbocharger shaft speed to the turbocharger shaft speed limit value; and control logic for limiting an applied engine torque to the dynamic engine torque limit value, wherein the turbocharger shaft speed limit value during the presence of the mode switch pending condition significantly exceeds the turbocharger shaft speed limit during the absence of the mode switch pending condition such that the presence of the mode switch pending condition results in a significantly increased error signal, resulting in a significantly increased dynamic engine torque limit value.

5. The control system of claim 4 wherein the turbocharger shaft speed limit value is based on engine speed.

6. The control system of claim 4 further comprising:

control logic for switching the mode of the sequential turbocharging system from the first mode to the second mode such that both the primary turbocharger and the secondary turbocharger are active.

7. A computer readable storage medium having information stored thereon representing instructions executable by an engine controller to control a vehicle having an internal combustion engine with a sequential turbocharging system, the sequential turbocharging system including a primary turbocharger and a secondary turbocharger, and being capable of operating in a first mode wherein the primary turbocharger is active while the secondary turbocharger is inactive, and further being capable of operating in a second mode wherein both the primary turbocharger and the secondary turbocharger are active, the computer readable storage medium further comprising:

instructions for determining the presence or absence of a mode switch pending condition in which the sequential turbocharging system is operating in the first mode and it is desired to operate the sequential turbocharging system in the second mode;

instructions for determining a turbocharger shaft speed limit value based on the presence or absence of the mode switch pending condition;

instructions for monitoring the primary turbocharger to determine a current value for a primary turbocharger shaft speed;

instructions for determining an error signal based on the current value for the primary turbocharger shaft speed and the turbocharger shaft speed limit value;

instructions for determining a dynamic engine torque limit value based on the error signal so as to track the current value for the primary turbocharger shaft speed to the turbocharger shaft speed limit value; and instructions for limiting an applied engine torque to the dynamic engine torque limit value, wherein the turbocharger shaft speed limit value during the presence of the mode switch pending condition significantly exceeds the turbocharger shaft speed limit during the absence of the mode switch pending condition such that the presence of the mode switch pending condition results in a significantly increased error signal, resulting in a significantly increased dynamic engine torque limit value.

8. The computer readable storage medium of claim 7 wherein the instructions for determining the turbocharger shaft speed limit value further comprise:

instructions for determining the turbocharger shaft speed limit value based on engine speed.

9. The computer readable storage medium of claim 7 further comprising:

instructions for switching the mode of the sequential turbocharging system from the first mode to the second mode such that both the primary turbocharger and the secondary turbocharger are active.

* * * * *